J. F. O'SHAUGHNESSY.
APPARATUS FOR USE IN GATHERING COTTON.
APPLICATION FILED AUG. 9, 1913.
1,103,620.
Patented July 14, 1914.
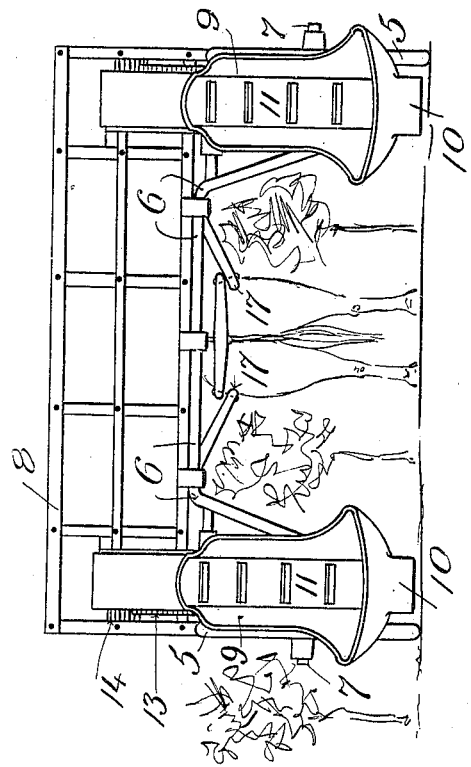
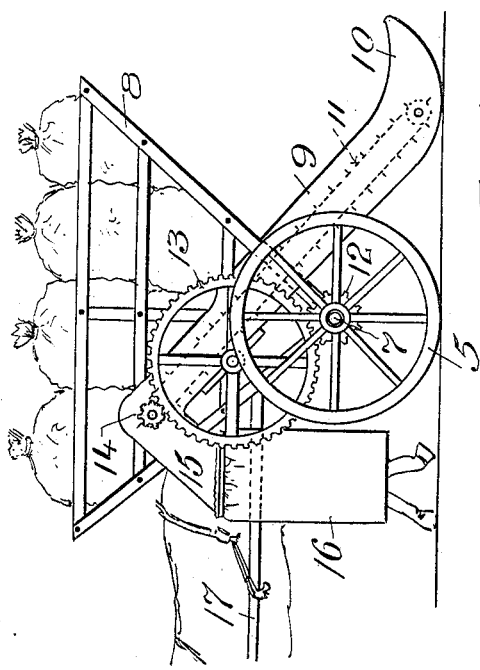

UNITED STATES PATENT OFFICE.

JAMES F. O'SHAUGHNESSY, OF NEW YORK, N. Y., ASSIGNOR, BY MESNE ASSIGNMENTS, TO COTTON GATHERING CORPORATION, OF NEW YORK, N. Y., A CORPORATION OF DELAWARE.

APPARATUS FOR USE IN GATHERING COTTON.

1,103,620.

Specification of Letters Patent. Patented July 14, 1914.

Application filed August 9, 1913. Serial No. 783,949.

*To all whom it may concern:*

Be it known that I, JAMES F. O'SHAUGHNESSY, a citizen of the United States, residing in the city, county, and State of New York, have made a certain new and useful Invention in Apparatus for Use in Gathering Cotton, of which the following is a specification.

This invention relates to apparatus for use in gathering cotton.

The object of the invention is to provide a machine which is simple in construction and economical to manufacture, and adapted in use to be progressed through a cotton field and along the rows of cotton, for receiving the cotton as picked by the hands of the operators and delivering the same into a bag or receptacle.

A further object is to provide a machine of the character referred to which is constructed to receive and transport the filled bags of cotton.

Other objects of the invention will appear more fully hereinafter.

The invention consists substantially in the construction, combination, location and arrangement of parts, all as will be more fully hereinafter set forth, as shown in the accompanying drawing and finally pointed out in the appended claims.

Referring to the drawing: Figure 1 is a view in side elevation of a construction embodying the principles of my invention. Fig. 2 is a view in rear elevation of the same.

In the harvesting of the cotton crop it is a common practice for the laborers to equip themselves with bags, which are suspended by straps over the shoulders, and to proceed through the cotton field and along the rows of cotton stalks, gathering the open cotton from the bolls by hand and depositing the gathered cotton into the suspended bag. This operation imposes excessive fatigue and labor by reason of the constant bending over of the laborers and by reason of having to support the increasing weight of the bags as the work progresses. This increased fatigue and labor, together with the impedance to freedom of movement on account of the bags carried by the laborers very materially impair the efficiency of the work and reduce the daily capacity of the individual laborers. In order to relieve the laborers of the toil, fatigue and labor thus imposed upon them by the practice and custom referred to, and to render them free in their movements while proceeding with their work, various constructions and arrangements of machines have been proposed. As a rule these machines have been open to the objection that they are cumbersome, unwieldly, difficult to handle in the field, and, where motor driven, require the constant care and attention of an engineer, besides being expensive and therefore not available for the small farmer.

It is among the special purposes of my present invention to provide a very simple and efficient machine for the purpose in view, which answers the requirements, which can be readily and easily handled in the field and by unskilled farm labor, and which is economical to manufacture, thereby placing it within the reach of the small farmer.

In carrying out my invention I employ a two wheeled cart, which, while it may be progressed through a cotton field and along the rows of cotton stalks by any other suitable means, is specially designed to be drawn by a horse or mule. Supported upon the axles of the two wheeled device is a frame designed to receive and transport the filled bags of cotton. Also supported on the axle, and operated from the wheels of the machine is an elevator or carrier designed to receive the cotton as picked or gathered and to deposit the same into a bag arranged upon and suspended from the frame of the machine to receive it.

In the drawing, reference sign 5 designates the two traction and supporting wheels of the machine. These are spaced a distance apart sufficient to accommodate any desired number of rows of cotton stalks between them. In the arrangement shown two rows of stalks are accommodated between the wheels 5.

The axle 6, intermediate the wheels is arched or raised to a height sufficient to easily enable it to readily pass over or above the tops of the cotton stalks of the intermediate rows, the wheels 5 being journaled upon the horizontal ends 7, of the axle. Supported upon the axle 6, is a cage or framework 8, which may be of any suitable construction and arrangement adapting it to receive and transport the bags of cotton as they become filled. Also supported upon the axle 6 or upon the frame 8, and preferably at the sides of the latter and in close proximity to the planes in which the wheels 5, operate are trough shaped carrier frames 9, which are downwardly and rearwardly inclined and terminate at their lower ends in bowl shaped portions 10. Operating in this trough or carrier frame is a conveyer 11. This conveyer may be operated in any suitable or convenient manner. I have shown a simple gearing where gears 12, on the hubs of the wheels 5, drive intermediate gears 13, the latter meshing with and driving gears 14, on the shafts or rollers at the upper ends of the carrier frames over which the conveyer operates. The conveyers deliver at their upper ends into downwardly turned chutes 15. The bags 16, to receive the gathered cotton are suspended from the mouths of these chutes. As soon as a bag is filled it is taken down and an empty bag suspended in its place while the filled bag is placed in the frame or cage 8. In the form shown the frame is provided with forwardly extending shafts 17, between which a horse or mule may be hitched for hauling the machine through the field.

The operation is very simple. The machine is driven slowly through the field the carrier frames 9 depending between adjacent rows of stalks. The laborers gather or pick the cotton and throw or deposit the same into the bowl portions 10, from which it is carried up by the conveyer and deposited into the suspended bags. Several laborers may thus pick and deposit the cotton into the same carrier. Being unhampered in their movements the daily capacity of each individual is greatly increased and at the expense of less fatigue, toil and wear than with the common method of gathering cotton.

Having now set forth the object and nature of my invention and a construction embodying the principles thereof, what I claim as new and useful and of my own invention, and desire to secure by Letters Patent is:

1. In a machine for use in gathering cotton, the combination of a pair of wheels, an axle supported by said wheels and arched between the wheels, a plurality of receptacles supported at their forward ends by said axle and each inclined rearwardly therefrom toward the ground, each of said receptacles open at the top throughout the greater part of its length, a conveyer in the bottom of each receptacle, and means for operating said conveyers.

2. In a machine for use in gathering cotton, the combination of a pair of wheels, an axle supported by said wheels and arched between the wheels, a plurality of receptacles supported at their forward ends by said axle and each inclined rearwardly therefrom toward the ground, each of said receptacles being open at the top throughout the greater part of its length, a conveyer in the bottom of each of said receptacles, and means actuated by said wheels for operating said conveyers.

3. In a machine for use in gathering cotton, the combination of a pair of wheels, an axle supported by and arched between said wheels, a plurality of receptacles supported at their forward ends by the elevated portion of said axle and inclined rearwardly therefrom toward the ground, each of said receptacles formed into a hopper at its lower end and open at the top, a conveyer operating in the bottom of each of said receptacles, and means for actuating said conveyers.

4. In a machine for use in gathering cotton, the combination with a pair of wheels, an axle supported thereby and arched or elevated between said wheels, a receptacle supported at its forward end upon the elevated portion of the axle and inclined rearwardly therefrom toward the ground, the upper forward end of said receptacle being turned downwardly to form a delivery mouth, said receptacle being open at its top, a conveyer operating in said receptacle and delivering to said mouth, means for suspending a bag beneath the delivery mouth of said receptacle, means for operating said conveyer, and a frame work supported by said axle.

In testimony whereof I have hereunto set my hand in the presence of the subscribing witnesses, on this 28th day of July, A. D. 1913.

JAMES F. O'SHAUGHNESSY.

Witnesses:
G. A. McGrath,
Walter A. Darby.

---

Copies of this patent may be obtained for five cents each, by addressing the "Commissioner of Patents, Washington, D. C."